US009976440B2

(12) United States Patent
Bennauer et al.

(10) Patent No.: US 9,976,440 B2
(45) Date of Patent: May 22, 2018

(54) METHOD FOR TESTING AN OVERSPEED PROTECTION MECHANISM OF A SINGLE-SHAFT COMBINED-CYCLE PLANT

(71) Applicant: Siemens Aktiengesellschaft, Munich (DE)

(72) Inventors: Martin Bennauer, Bottrop (DE); Edwin Gobrecht, Ratingen (DE); Martin Hallekamp, Dulmen-Buldern (DE)

(73) Assignee: Siemens Aktiengesellschaft, Munich (DE)

( * ) Notice: Subject to any disclaimer, the term of this patent is extended or adjusted under 35 U.S.C. 154(b) by 227 days.

(21) Appl. No.: 14/895,071

(22) PCT Filed: May 26, 2014

(86) PCT No.: PCT/EP2014/060773
§ 371 (c)(1),
(2) Date: Dec. 1, 2015

(87) PCT Pub. No.: WO2014/195163
PCT Pub. Date: Dec. 11, 2014

(65) Prior Publication Data
US 2016/0123183 A1 May 5, 2016

(30) Foreign Application Priority Data
Jun. 6, 2013 (EP) .................................... 13170738

(51) Int. Cl.

| | |
|---|---|
| ***G01M 15/14*** | (2006.01) |
| ***F01D 21/20*** | (2006.01) |
| ***F01D 21/00*** | (2006.01) |

(52) U.S. Cl.
CPC ........... *F01D 21/20* (2013.01); *F01D 21/003* (2013.01); *F05D 2220/31* (2013.01); *F05D 2220/32* (2013.01)

(58) Field of Classification Search
USPC .......................................... 73/112.01, 112.02
See application file for complete search history.

(56) References Cited

U.S. PATENT DOCUMENTS

| | | | | |
|---|---|---|---|---|
| 6,116,853 | A | 9/2000 | Steinborn | |
| 6,785,633 | B2 | 8/2004 | Patanian et al. | |
| 8,661,880 | B2 | 3/2014 | Block et al. | |
| 2005/0022497 | A1 * | 2/2005 | Takai | F01K 23/101 60/39.182 |
| 2006/0042265 | A1 * | 3/2006 | Drob | F01D 21/16 60/779 |

(Continued)

FOREIGN PATENT DOCUMENTS

| | | | |
|---|---|---|---|
| CN | 102071978 | A | 5/2011 |
| CN | 102252845 | A | 11/2011 |

(Continued)

OTHER PUBLICATIONS

JP Office Action dated Dec. 12, 2016, for JP patent application No. 2016-517228.

(Continued)

*Primary Examiner* — Eric S McCall
(74) *Attorney, Agent, or Firm* — Beusse Wolter Sanks & Maire

(57) ABSTRACT

A method for testing an overspeed protection mechanism of a single-shaft combined-cycle plant that includes, during testing, an electrical load is first connected to the generator and the load is disconnected and a trigger threshold value can be achieved at a test moment in time, thereby triggering the overspeed protection mechanism.

11 Claims, 1 Drawing Sheet

(56) References Cited

U.S. PATENT DOCUMENTS

| | | | | |
|---|---|---|---|---|
| 2011/0018265 | A1* | 1/2011 | Hoffmann | F01K 13/02 290/7 |
| 2011/0232259 | A1 | 9/2011 | Block et al. | |
| 2011/0238358 | A1* | 9/2011 | Block | F01K 23/16 702/113 |
| 2012/0240589 | A1* | 9/2012 | Tateishi | F01K 7/22 60/772 |
| 2014/0060066 | A1 | 3/2014 | Hesse | |
| 2016/0201501 | A1* | 7/2016 | Ophey | F01D 21/003 73/112.02 |

FOREIGN PATENT DOCUMENTS

| | | | |
|---|---|---|---|
| DE | 29908581 | U1 | 8/1999 |
| EP | 2372108 | A2 | 10/2011 |
| EP | 2372482 | A | 10/2011 |
| EP | 2372482 | A2 | 10/2011 |
| EP | 2458180 | A1 | 5/2012 |
| FR | 2947300 | A1 | 12/2010 |
| JP | 2000154703 | A | 6/2000 |
| JP | 2011197006 | A | 10/2011 |
| JP | 2012145034 | | 8/2012 |
| RU | 2310226 | C2 | 11/2007 |
| RU | 2009137121 | A | 4/2011 |
| SU | 848710 | A1 | 7/1981 |
| TW | 200905068 | A | 2/2009 |

OTHER PUBLICATIONS

RU Office Action dated Jan. 31, 2017, for RU patent application No. 2015155901.

JP office action dated Mar. 17, 2017, for JP patent application No. 2016-517228.

* cited by examiner

METHOD FOR TESTING AN OVERSPEED PROTECTION MECHANISM OF A SINGLE-SHAFT COMBINED-CYCLE PLANT

CROSS REFERENCE TO RELATED APPLICATIONS

This application is the US National Stage of International Application No. PCT/EP2014/060773 filed May 26, 2014, and claims the benefit thereof. The International Application claims the benefit of European Application No. EP13170738 filed Jun. 6, 2013. All of the applications are incorporated by reference herein in their entirety.

FIELD OF INVENTION

The invention relates to a method for testing an overspeed protection mechanism of a single-shaft combined-cycle plant, wherein, during test operation, the gas turbine and the steam turbine are operated at a test speed, wherein the generator is operated with a connected load and load is shed during the test operation.

BACKGROUND OF INVENTION

For the safe operation of a combined-cycle turbine plant, it is necessary for the rotational speeds to be determined and monitored. In general, the speed of a combined-cycle turbine power plant is at a constant frequency of 50 Hz or 60 Hz. This speed can be exceeded under certain circumstances, which can be referred to as an overspeed. When this overspeed exceeds a critical value, a protection mechanism should take place in that measures are taken and further increase in the rotational speed is prevented. This is generally achieved by switching off the supply of steam to the steam turbine and switching off the supply of fuel to the gas turbine. In this case, therefore, the steam turbine will be tripped after the gas turbine.

EP 2 372 482 A2 discloses a method and a system for testing an overspeed protection system of a turbomachine.

DE 299 08 581 U1 discusses a device for monitoring the operational safety of a turbine in the event of load shedding.

FR 2 947 300 A1 discloses a method for testing a turbomachine.

Hitherto, the test mechanisms for overspeed protection of steam turbine and gas turbine plants could be monitored by setting the triggering limit value for the overspeed protection mechanism to a lower speed than the operating speed. In test operation, it is possible to exceed this lower test speed and to check whether the overspeed protection mechanism works.

It would however be desirable to also carry out this test operation with original triggering limit values. That means that the overspeed protection mechanism should be checked proceeding from the operational speeds. This is also desirable given that in certain countries such an overspeed protection, which is to take place with original triggering limit values, is prescribed by law. In the case of single-shaft plants, such a check can be performed only for the gas and steam turbines together, taking into account the permissible configuration parameters.

SUMMARY OF INVENTION

The invention has an object of indicating a method for testing a single-shaft combined-cycle plant, wherein the overspeed protection mechanism test can be performed proceeding from operational speeds.

This object is achieved with a method for testing an overspeed protection mechanism of a single-shaft combined-cycle plant, wherein, during test operation, the gas turbine and the steam turbine are operated at a test speed, wherein the generator is operated with a connected load, wherein, during the test operation, load is shed, wherein the speed of the steam turbine increases and, upon reaching a ST triggering limit value, a ST overspeed protection mechanism is triggered.

An essential consideration of the invention is thus that the steam and gas turbine drives an electric generator at a test speed which corresponds to the operating speed of 50 Hz or 60 Hz, wherein an electric load is arranged on the electric generator. This electric load leads to increased torque on the rotors of the gas and steam turbine. Shedding load, i.e. switching off the electric load abruptly, changes the counteraction of the torque on the gas and steam turbine rotors, the consequence of which is that the rotational speed increases more or less abruptly since the inertia of the system means that the control of the steam supply and fuel supply to the gas turbine is not sufficient.

The load shedding thus causes an increase in the rotational speed of the steam turbine and necessarily of the gas turbine, and a ST overspeed protection mechanism should be triggered upon reaching a ST triggering limit value.

Advantageous developments are specified in the dependent claims.

In a first advantageous development, the steam turbine reaches the ST triggering limit value first, triggering the ST overspeed protection mechanism, and then the gas turbine reaches a GT limit value, the GT overspeed protection mechanism being triggered once the GT limit value has been reached. Thus, in this advantageous development, it is necessary for two triggering conditions to be reached in succession in order to first trigger the overspeed protection mechanism of the steam turbine and subsequently that of the gas turbine. The ST triggering limit value must be reached first, and then the GT limit value.

In a further advantageous development, in test operation, the steam turbine is in a fully warmed state. That means that, in test operation, the operating parameters of the steam turbine are ideally reached and no temporary effects in live operation need be taken into account.

In an advantageous development, in test operation, the gas turbine is operated at low power.

In a further advantageous development, in test operation, the gas turbine is operated with a constant exhaust gas temperature.

In a further advantageous development, a time $t_{Triggering}$ elapses between the triggering of the ST overspeed protection mechanism and the load shedding, and $t_{Triggering}<t_{max}$, wherein the steam turbine is tripped when $t_{Triggering}>t_{max}$ and the ST overspeed protection mechanism has not yet been triggered.

BRIEF DESCRIPTION OF THE DRAWINGS

An exemplary embodiment of the invention is described in more detail below. Schematically, in the figures.

DETAILED DESCRIPTION OF INVENTION

Figure 1:
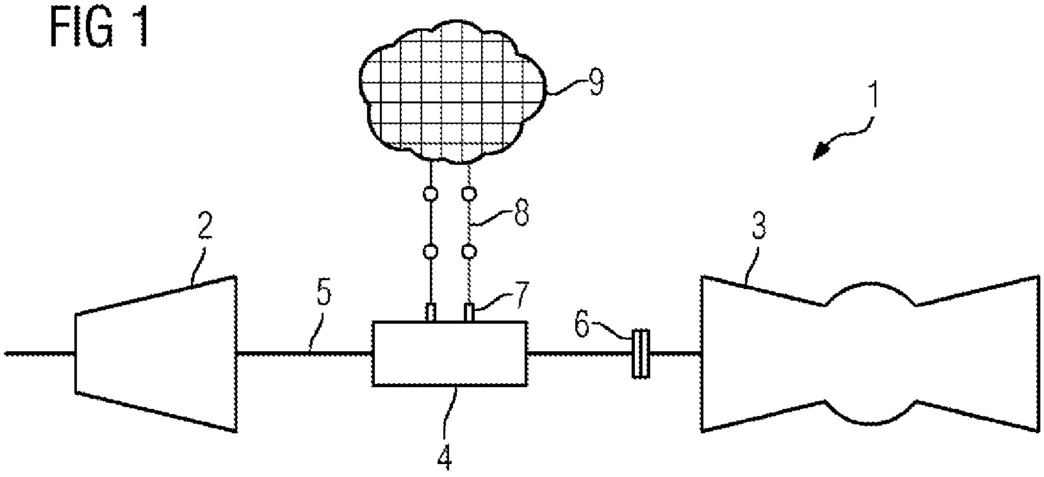
FIG. 1 shows a schematic overview of a single-shaft combined-cycle plant.

FIG. 1 shows a single-shaft combined-cycle plant 1. This single-shaft combined-cycle plant 1 comprises a steam turbine 2, a gas turbine 3 and an electric generator 4, which are connected to one another in a torque-transmitting manner via a common shaft 5. Between the gas turbine 3 and the electric generator 4, there is arranged a coupling 6 by means of which the transmission of torque can be interrupted.

An electric consumer 9 or an electric load 9 is connected to an output 7 of the electric generator 4 via a switch 8. FIG. 1 shows the switch 8 in the closed state.

Figure 2:
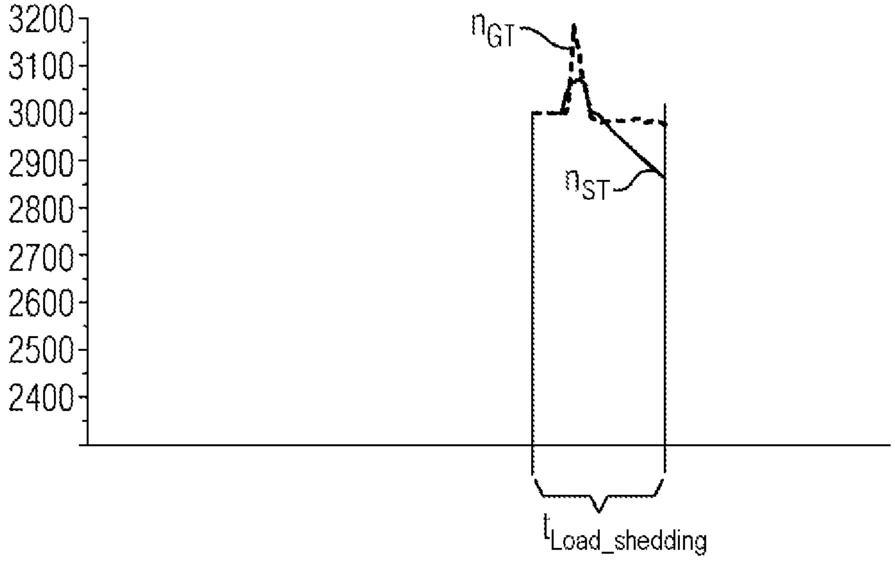
FIG. 2 shows a rotational speed profile after load shedding.

FIG. 2 shows a rotational speed profile of the gas turbine ($n_{GT}$) and of the steam turbine ($n_{ST}$). The rotational speed profiles illustrated in FIG. 2 show the rotational speed profile of the gas turbine 3 and of the steam turbine 2 when the coupling 6 is closed. First, the gas turbine 3 and steam turbine 2 are operated at a constant speed of 3000 revolutions per minute. At time $t=t_{Load\_shedding}$, the electric consumer 9 is separated from the generator 4 by means of the switch 8. The consequence of this is that the speed of the gas turbine ($n_{GT}$) and of the steam turbine ($n_{ST}$) increases temporarily and once a triggering limit value is reached, the steam turbine 2 is tripped, which leads to a sharp drop in the rotational speed, as shown in FIG. 2.

The live overspeed protection must take place with a triggering limit value of the overspeed protection mechanism which is unchanged with respect to normal operation. During the test, the gas turbine 3 and steam turbine 2 are accelerated in a defined manner to the triggering limit value of the associated overspeed protection mechanism. When the triggering limit values are exceeded, the overspeed protection mechanism must shut down the corresponding actuating elements of the gas turbine 3 and the steam turbine 2, and thus prevent critical overspeeds. In the context of functional safety, the live overspeed protection mechanism test is not a real demand on the protection mechanism since the controllers approach the corresponding triggering limit values with defined dynamics and a critical overspeed does not materialize.

In the case of single-shaft combined-cycle plants 1, both the gas turbine 3 and the steam turbine 2 are each equipped with a separate overspeed protection mechanism. Due to the mechanical coupling 6 between the gas turbine 3 and the steam turbine 2, it is impossible in single-shaft plants for the speed of the steam turbine 2 to be higher than the speed of the gas turbine 3. Furthermore, the gas turbine 3 must provide sufficient boiler power for the live overspeed test of the steam turbine 2. Thus, the overspeed test of the steam turbine 2 cannot take place independently of the gas turbine 3. The method for testing the overspeed protection mechanism of the single-shaft combined-cycle plant 1 is as follows: during test operation, the gas turbine 3 and the steam turbine 2 are operated at a test speed equal to the operational speed of 3000 revolutions per minute. The generator 4 is operated with a connected load 9, wherein, during the test operation, load is shed at time $t_{Load\_shedding}$, raising the speed of the steam turbine 2 and of the gas turbine 3, a ST overspeed protection mechanism being triggered when a ST triggering limit value is reached and a GT overspeed protection mechanism being triggered when the GT triggering limit value is reached. The consequence of this is that the speed of the steam turbine 2 and of the gas turbine 3 is reduced.

The mass moment of inertia and/or the response time constant influences the dynamic behavior of the gas turbine 3 and the steam turbine 2 after the load shedding. The ratio of the response time constants has an influence on the choice of triggering limit value.

In the case of the single-shaft combined-cycle plant 1, load shedding leads automatically to quick shutdown of the steam turbine 2. For that reason, the triggering limit value of the steam turbine overspeed protection mechanism can also be set to a value marginally above (e.g. 104% of) the maximum grid frequency (for example 61.5 Hz) without reducing the plant availability. The difference between the maximum permissible grid frequency and the triggering limit value of the steam turbine overspeed protection mechanism is chosen such that no undesired trip takes place during operation.

A further limiting condition is that the triggering limit value of the steam turbine overspeed protection mechanism is not greater than the triggering limit value of the gas turbine overspeed protection mechanism.

The triggering limit value of the gas turbine overspeed protection mechanism must be set to a value above the maximum speed after load shedding and below the critical overspeed. The triggering limit value must be chosen such that the steam turbine 2 reaches the triggering limit value before the gas turbine 3.

The control system technology of the gas turbine 3 and steam turbines 2 of a single-shaft combined-cycle plant 1 is augmented such that a switch is installed by means of which the live overspeed test is activated. This function is deactivated automatically after a maximum time period which can be set, in order to protect the steam turbine 2 from contact with too-cold steam. The maximum time period must be chosen so as to correspond to the duration of the live overspeed test with the limiting condition that the steam temperatures remain within the permitted range during the test. The method is characterized by the following: in dependence on the switch, in the case of the gas turbine 3 first the load shedding detection is blocked and automated, for example time-delayed, opening of the switch 8 of the generator 4 is effected. In the case of the steam turbine 2, in dependence on the switch, first the rotational speed controller setpoint value is set to a value marginally above the triggering limit value of the steam turbine overspeed protection mechanism, which can for example be 105%, wherein the controller should approach the limit value with a defined acceleration. The magnitude of the acceleration influences the test duration. Subsequently, the limit frequency influence is deactivated and then the influence of the gas turbine fire power on the steam turbine controller is suppressed. In this context, it is then necessary for possibly the overall rapid shutdown mechanism in the event of coupling disturbances to be controlled for the duration of the overspeed test, which is necessary only if the gas turbine 3 is tripped by the overall rapid shutdown mechanism before reaching the triggering limit value.

The method for testing the overspeed protection mechanism of the single-shaft combined-cycle plant 1 is carried out as long as the steam turbine 2 is fully hot and has been in operation for longer than 5 hours. The gas turbine 3 is operated with lowest possible power and constant exhaust gas temperature, which is reflected by the IGV point. The overspeed test is activated by actuating the switch in the control system technology. When the overspeed test is activated, the necessary switchovers will take place in automated fashion, and the automated opening of the switch 8 takes place with a certain delay. The gas turbine 3 and steam turbine 2 then approach the triggering limit value in a defined fashion. The steam turbine 2 reaches its triggering limit value first, the gas turbine 3 reaching its triggering limit value shortly after. This overall procedure must not exceed a certain time, which is to be set, since the steam then becomes impermissibly cold. For that reason, the operation of live overspeed testers is actively automatically deactivated after a few seconds, which can be set, which causes the steam turbine to be tripped.

The invention claimed is:

1. A method for testing an overspeed protection mechanism of a single-shaft combined-cycle plant, the plant comprising a gas turbine, a steam turbine, and a generator all connected to a common shaft to rotate at a common speed under automated control of a control system, the method comprising:

providing in the control system a first overspeed triggering limit for the steam turbine for a normal operation of the plant, a second relatively higher overspeed triggering limit for the gas turbine for the normal operation of plant, and a switch that initiates the following automated ordered steps by the control system:

operating the gas turbine and the steam turbine at a test speed, wherein the generator is synchronized with a connected load; and disconnecting the load from the generator;

allowing the common speed to increase to the first overspeed triggering limit and then to the second overspeed triggering limit without changing the first and second overspeed triggering limits;

wherein in response to the common speed reaching the first overspeed triggering limit, the overspeed protection mechanism is triggered as to the steam turbine, and trips the steam turbine.

2. The method as claimed in claim 1, wherein in response to the common speed reaching the second overspeed triggering limit, the overspeed protection mechanism is triggered as to the gas turbine, and trips the gas turbine.

3. The method as claimed in claim 1, wherein, in test operation, the steam turbine is in a fully warmed state.

4. The method as claimed in claim 1, wherein, in test operation, the gas turbine is operated at low power.

5. The method as claimed in claim 1, wherein, in test operation, the gas turbine is operated with a constant exhaust gas temperature.

6. The method as claimed in claim 1, further comprising:

the control system monitoring a time period starting from the disconnecting of the load; and the control system automatically tripping the steam turbine in response to the time period exceeding a permissible maximum and the overspeed protection mechanism having not yet been triggered as to the steam turbine.

7. The method as claimed in claim 1, wherein:

the first overspeed triggering limit is 104% of a maximum permissible frequency of the connected load; and the allowing step comprises setting a setpoint of the common speed to 105% of the maximum permissible frequency of the connected load, increasing the common speed toward the 105% setpoint with a defined acceleration, and subsequently deactivating the 105% setpoint.

8. A method for testing an overspeed protection mechanism of a single-shaft combined-cycle plant, the plant comprising a gas turbine, a steam turbine, and a generator all connected to a common shaft to rotate at a common speed controlled automatically by a controller, the method of testing comprising:

prior to testing the overspeed protection mechanism, setting in the controller a first overspeed triggering limit for the steam turbine that is above a maximum permissible frequency for an electrical grid connected as a load on the generator;

prior to testing the overspeed protection mechanism, setting in the controller a second overspeed triggering limit for the gas turbine that is higher than the first overspeed triggering limit;

providing an automated sequence in the controller comprising the following ordered steps:

operating the gas turbine and the steam turbine with the common speed synchronized to the electrical grid connected to the generator;

disconnecting the electrical grid from the generator;

setting a rotational speed setpoint above the maximum permissible frequency;

increasing the common speed toward the rotational speed setpoint with a defined acceleration; and the overspeed protection mechanism tripping the steam turbine by shutting down actuating elements thereof in response to the first triggering limit being reached by the common speed.

9. The method as claimed in claim 8, wherein:

the first overspeed triggering limit is 104% of a maximum permissible frequency of the electrical grid; and the setting step comprises setting the rotational speed setpoint to 105% of the maximum permissible frequency of the electrical grid, increasing the common speed toward the 105% speed setpoint, and subsequently deactivating the 105% speed setpoint.

10. The method of claim 8, further comprising in the automated sequence:

tripping the steam turbine in response to it not being tripped by the overspeed protection mechanism within a predetermined time period starting from the disconnecting of the load in the automated sequence.

11. The method of claim 10, further comprising, after the overspeed protection mechanism is triggered as to the steam turbine:

the control system increasing the common speed by operating the gas turbine until the second triggering limit is reached; and tripping the gas turbine by shutting down actuating elements thereof in response to the second triggering limit being reached by the common speed;

wherein the control system tests the steam and gas turbine overspeed triggering in the automatic sequence.

* * * * *